United States Patent [19]

Gergen et al.

[11] 4,242,470

[45] Dec. 30, 1980

[54] POLYAMIDE/BLOCK COPOLYMER BLENDS

[75] Inventors: William P. Gergen; Sol Davison, both of Houston, Tex.

[73] Assignee: Shell Oil Company, Houston, Tex.

[21] Appl. No.: 21,518

[22] Filed: Mar. 19, 1979

[51] Int. Cl.³ .............................................. C08L 53/02
[52] U.S. Cl. ...................................... 525/92; 525/314
[58] Field of Search ...................... 260/857 D; 525/92

[56] References Cited

U.S. PATENT DOCUMENTS

| | | | |
|---|---|---|---|
| 3,546,319 | 12/1970 | Prevorsek | 260/857 D |
| 4,041,103 | 8/1977 | Davison | 260/857 D |
| 4,048,254 | 9/1977 | Hillier | 260/857 D |
| 4,048,255 | 9/1977 | Hillier | 260/857 D |
| 4,080,356 | 3/1978 | Gergen | 260/857 D |
| 4,080,357 | 3/1978 | Gergen | 260/857 D |
| 4,081,424 | 3/1978 | Gergen | 260/857 D |
| 4,085,163 | 4/1978 | Gergen | 260/857 D |
| 4,088,626 | 5/1978 | Gergen | 260/857 D |
| 4,088,627 | 5/1978 | Gergen | 260/857 D |
| 4,090,996 | 5/1978 | Gergen | 260/857 D |
| 4,102,854 | 7/1978 | Gergen | 260/857 D |
| 4,107,130 | 8/1978 | Gergen | 260/857 D |
| 4,110,303 | 8/1978 | Gergen | 260/857 D |
| 4,111,894 | 9/1978 | Gergen | 260/857 D |
| 4,111,895 | 9/1978 | Gergen | 260/857 D |
| 4,111,896 | 9/1978 | Gergen | 260/857 D |
| 4,117,035 | 9/1978 | Hillier | 260/857 D |
| 4,126,600 | 11/1978 | Gergen | 260/857 D |

*Primary Examiner*—Paul Lieberman
*Attorney, Agent, or Firm*—Dean F. Vance

[57] ABSTRACT

A polymer blend having excellent impact strength, even at zero moisture level, comprises the blend of 100 parts by weight of a polyamide and less than 50 parts by weight of a selectively hydrogenated monoalkenyl arene-conjugated diene block polymer.

19 Claims, No Drawings

POLYAMIDE/BLOCK COPOLYMER BLENDS

BACKGROUND OF THE INVENTION

Polyamides or nylon plastics have been in use in the United States since about 1941. The presence of the amide group in the polymer provides a focal point for hydrogen bonding which results in the formation of crystalline structures that are characterized by toughness, resistance to oil and solvents, superior physical strength, a degree of sensitivity to moisture, and high melting points. Due to their overall superior balance of properties, polyamides are considered to by engineering thermoplastics and complete with metals and other materials in many applications. However, the sensitivity of the polyamides to moisture has kept them out of many end use areas. For example, at zero moisture level, nylon 6/6 has a notched impact resistance value of only about 20 inch-pounds compared to a value of 560 inch-pounds at a 0.68 percent water level. This drastic reduction in impact strength at zero water level results in a large number of molded parts destroyed in shipping as well as the failure of parts which are impacted after being put into service in environments which tend to reduce the moisture level in nylon functional parts.

RELATED PATENTS

The inventors in the present invention have recently been issued a number of U.S. and foreign patents on polymer blends of engineering thermoplastics and block copolymers. These patents, all with the same inventors and assignee, include the following, among others:

U.S. Pat. No. 4,041,103—Blends of 100 parts of a block copolymer with 5 to 200 parts of a polyamide.

U.S. Pat. No. 4,085,163—Blends of 4 to 40 parts of a block copolymer, 5 to 48 parts of a dissimilar engineering thermoplastic, and a major amount of a polyamide.

U.S. Pat. No. 4,110,303—Blends of 4 to 40 parts of a block copolymer, 5 to 48 parts of a polyamide, and a major amount of a polyolefin.

SUMMARY OF THE INVENTION

The present invention differs from the prior art in that the present invention covers the binary blend of 100 parts by weight of a polyamide and less than 50 parts by weight of a selectively hydrogenated monoalkenyl arene/conjugated diene block copolymer. It has unexpectedly been found that even minor amounts of the block copolymer when added to polyamides results in a significant improvement in the typical disastrous impact/moisture relationship. In particular, the present invention comprises the admixture obtained by intimately mixing 100 parts by weight of a polyamide with less than 50 parts by weight of a block copolymer wherein said block copolymer comprises at least two monoalkenyl arene blocks A and at least one substantially completely hydrogenated conjugated diene polymer block B.

The block copolymer of the instant invention effectively acts as a mechanical or structural stabilizer which interlocks the polymer structure networks and prevents the consequent separation of the polymers during processing and their subsequent use. As defined more fully hereinafter, the resulting structure of the instant polyblend (short for "polymer blend") is that of two at least partial continuous interlocking networks. This interlocked structure results in a dimensionally stable polyblend that will not delaminate upon extrusion and subsequent use.

To produce stable blends it is necessary that both polymers have at least partial continuous networks which interlock with each other. In an ideal situation both polymers would have complete continuous networks which interlock with each other. A partial continuous network means that a portion of the polymer has a continuous network phase while the other portion has a disperse phase structure. Preferably, a major proportion (greater than 50% by weight) of the partial continuous network is continuous.

In addition to greatly improving the impact resistance of the polyamide compositions at zero moisture level, it is expected that compositions according to the present invention will also be thermoformable and blow moldable. Polyamides in general were not considered thermoformable or blow moldable in the past because of inadequate melt strength. This new freedom of manufacture opens up new applications for polyamide-based materials such as thermoformed structural panels and blow molded containers.

Further the addition of the block copolymer to the polyamides significantly reduces the amount of moisture picked up by the polyamide over a period of time. This stabilizing effect is very important since it makes processing and physical properties less sensitive to changes in environment.

DETAILED DESCRIPTION OF THE INVENTION

A. Block Copolymer

The block copolymers employed in the present invention may have a variety of geometrical structures, since the invention does not depend on any specific geometrical structure, but rather upon the chemical constitution of each of the polymer blocks. Thus, the structures may be linear, radial or branched so long as each copolymer has at least two polymer end blocks A and at least one polymer mid block B as defined above. Methods for the preparation of such polymers are known in the art. Particular reference will be made to the use of lithium based catalysts and especially lithium-alkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear (or ABA-type) polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Branched or radial copolymers typically have the structure $(A-B-)_xB-A$ where x has a value of greater than 1, preferably about 2 to about 15, more preferably about 2 to about 6. Coupling may be effected with multifunctional coupling agents such as dihaloalkanes or -alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species: polystyrene-polybutadiene-polystyrene (SBS); polystyrene-polyisoprene-polystyrene (SIS); poly(alpha-methylstyrene)-polybutadiene-poly(alpha-methylstyrene) and poly(alpha-methylstyrene)-polyisoprene-poly(alpha-methylstyrene).

It will be understood that both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs or homologs including alphamethylstyrene and ring-substituted styrenes, particularly ring-methylated styrenes. The preferred monoalkenyl arenes are styrene and alphamethylstyrene, and styrene is particularly preferred. The blocks B may comprise homopolymers of butadiene or isoprene and copolymers of one of these two dienes or copolymers with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to subtantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 350,000, preferably from about 35,000 to about 300,000. These molecular weights are most accurately determined by tritium counting methods or osmotic pressure measurements.

The proportion of the monoalkenyl arene blocks should be between about 8 and 65% by weight of the block copolymer, preferably between about 10 and 30% by weight.

While the average molecular weight of the individual blocks is not critical, at least within the above specified limits, it is important to select the type and total molecular weight of the block copolymer in order to ensure the compatibility necessary to get the interlocking network under the chosen blending conditions. As discussed more fully hereinafter, best results are obtained when the viscosity of the block copolymer and the engineering thermoplastic resin are substantially the same at the temperature used for blending and processing. In some instances, matching of the viscosity of the block copolymer portion and the resin portion are best achieved by using two or more block copolymers or resins. For example, a blend of two block copolymers having different molecular weights or a blend of a hydrogenated SBS and hydrogenated SIS polymers may be employed.

Matching of the viscosity of the block copolymer portion and the engineering thermoplastic resin portion may also be accomplished by adding supplemental blending components such as hydrocarbon oils and other resins. These supplementary components may be blended with the block copolymer portion or the engineering thermoplastic resin portion, but it is preferred to add the additional components to the block copolymer portion. This pre-blended block copolymer composition is then intimately mixed with the engineering thermoplastic resin to form compositions according to the present invention.

The types of oils useful in the practice of this invention are those polymer extending oils ordinarily used in the processing of rubber and plastics, e.g., rubber compounding oils. Especially preferred are the types of oil that are compatible with the elastomeric segment of the block copolymer. While oils of higher aromatic content are satisfactory, those petroleum-based white oils having low volatility and less than 50% aromatics content as determined by the clay gel method of tentative ASTM method D 2007 are particularly preferred. The oils should additionally have low volatility, preferably having an initial boiling point above 500° F. The amount of oil employed varies from about 0 to about 100 phr (parts by weight per hundred parts by weight rubber, or block copolymer as in this case), preferably about 5 to 30 phr.

B. Polyamides

By polyamide is meant a condensation product which contains recurring aromatic and/or aliphatic amide groups as integral parts of the main polymer chain, such products being known generically as "nylons." These may be obtained by polymerizing a monoaminomonocarboxylic acid or an internal lactam thereof having at least two carbon atoms between the amino and carboxylic acid groups, or by polymerizing substantially equimolar proportions of a diamine which contains at least two carbon atoms between the amino groups and a dicarboxylic acid; or by polymerizing a monoaminocarboxylic acid or an internal lactam thereof as defined above together with substantially equimolecular proportions of a diamine and a dicarboxylic acid. The dicarboxylic acid may be used in the form of a functional derivative thereof, for example an ester.

The term "substantially equimolecular proportions" (of the diamine and of the dicarboxylic acid) is used to cover both strict equimolecular proportions and the slight departures therefrom which are involved in conventional techniques for stabilizing the viscosity of the resultant polyamides.

As examples of the said monoaminomonocarboxylic acids or lactams thereof there may be mentioned those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned ε-aminocaproic acid, butyrolactam, pivalolactam, caprolactum, capryl-lactam, enantholactam, undecanolactam, dodecanolactam and 3- and 4-amino benzoic acids.

Examples of the said diamines are diamines of the general formula $H_2N(CH_2)_nNH_2$ wherein n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine.

C-alkylated diamines, e.g. 2,2-dimethylpentamethylenediamine and 2,2,4- and 2,4,4-trimethylhexamethylenediamine are further examples. Other diamines which may be mentioned as examples are aromatic diamines, e.g. p-phenylenediamine, 4,4'-diaminodiphenyl sulphone, 4,4'-diaminodiphenyl ether and 4,4'-diaminodiphenyl sulphone, 4,4'-diaminodiphenyl ether and 4,4'-diaminodiphenylmethane; and cycloaliphatic diamines, for example diaminodicyclohexylmethane.

The said dicarboxylic acids may be aromatic, for example isophthalic and terephthalic acids. Preferred dicarboxylic acids are of the formula HOOC—Y—COOH wherein Y represents a divalent aliphatic radical containing at least 2 carbon atoms, and examples of such acids are sebacic acid, octadecanedioc acid, suberic acid, azelaic acid, undecanedioic acid, glutaric acid, pimelic acid, and especially adipic acid. Oxalic acid is also a preferred acid.

Specifically of the following polyamides may be incorporated in the thermoplastic polymer blends of the invention:
polyhexamethylene adipamide (nylon 6:6)
polypyrrolidone (nylon 4)
polycaprolactam (nylon 6)
polyheptolactam (nylon 7)
polycapryllactam (nylon 8)
polynonanolactam (nylon 9)
polyundecanolactam (nylon 11)
polydodecanolactam (nylon 12)
polyhexamethylene azelaiamide (nylon 6:9)
polyhexamethylene sebacamide (nylon 6:10)
polyhexamethylene isophthalamide (nylon 6:iP)
polymethaxylylene adipamide (nylon MXD:6)
polyamide of hexamethylenediamine and n-dodecanedioic acid (nylon 6:12)
polyamide of dodecamethylenediamine and n-dodecanedioic acid (nylon 12:12).

Nylon copolymers may also be used, for example copolymers of the following:
hexamethylene adipamide/caprolactam (nylon 6:6/6)
hexamethylene adipamide/hexamethylene-isophthalamide (nylon 6:6/6iP)
hexamethylene adipamide/hexamethylene-terephthalamide (nylon 6:6/6T)
trimethylhexamethylene oxamide/hexamethylene oxamide (nylon trimethyl-6:2/6:2)
hexamethylene adipamide/hexamethylene-azelaiamide (nylon 6:6/6:9)
hexamethylene adipamide/hexamethylene-azelaiamide/caprolactam (nylon 6:6/6:9/6).

Also useful is nylon 6:3 produced by Dynamit Nobel. This polyamide is the product of the dimethyl ester of terephthalic acid and a mixture of isomeric trimethyl hexamethylenediamine. Another useful nylon is DuPont's Zytel ® ST which is a nylon-based alloy.

Preferred nylons include 6,6:6, 11, 12, 6:3 and 6:12.

The number average molecular weights of the polyamides used in the invention are generally above about 10,000.

C. Method of Forming Interlocking Networks

It is an important aspect of the present invention that the various polymers be blended in such a way as to form a co-continuous interlocking network, i.e., where a continuous phase of one polymer would be thought of as filling the voids of a continuous phase of the second polymer. The interlocking structure of the various polymers does not show gross phase separation such as would lead to delamination. Further, the blend is not so intimately mixed that there is molecular mixing or miscibility, nor one in which the separate phases will lead to delamination.

Without wishing to be bound to any particular theory, it is considered that there are two general requirements for the formation of an interlocking network. First, there must be a primary phase network stable to the shearing field. This requirement is fulfilled by employing the block copolymers of the instant invention having the capability of self-crosslinking (network formation) and furthermore having sufficiently high molecular weight to retain its network (domain) structure in processing. Second, the other polymers employed must be capable of some kind of chemical or physical crosslinks or other intermolecular association to maintain a continuous phase in the blend. The polymer must possess a sufficient fluidity to interlock with the primary network in the blending process. This second requirement is met by the instant polyamides.

There are at least two methods (other than the absence of delamination) by which the presence of an interlocking network can be shown. In one method, an interlocking network is shown when molded or extruded objects made from the blends of this invention are placed in a refluxing solvent that quantitatively dissolves away the block copolymer and other soluble components, and the remaining polymer structure (comprising the thermoplastic engineering resin) still has the shape and continuity of the molded or extended object and is intact structurally without any crumbling or delamination, and the refluxing solvent carries no insoluble particulate matter. If these criteria are fulfilled, then both the unextracted and extracted phases are interlocking and continuous. The unextracted phase must be continuous because it is geometrically and mechanically intact. The extracted phase must have been continuous before extraction, since quantitative extraction of a dispersed phase from an insoluble matrix is highly unlikely. Finally, interlocking networks must be present in order to have simultaneous continuous phases. Also, confirmation of the continuity of the unextracted phase may be confirmed by microscopic examination.

In the second method, a mechanical property such as tensile modulus is measured and compared with that expected from an assumed system where each continuous isotropically distributed phase contributes a fraction of the mechanical response, proportional to its compositional fraction by volume. Correspondence of the two values indicates presence of the interlocking network, whereas, if the interlocking network is not present, the measured value is different than that of the predicted value.

The relative properties of the polymers are presented below in parts by weight:

|  | Preferred | More Preferred | Most Preferred |
| --- | --- | --- | --- |
| Block Copolymer | Less than 50 | 1 to 40 | 4 to 20 |
| Polyamide | 100 | 100 | 100 |

The blending of the polyamide and the block copolymer may be done in any manner that produces a blend which will not delaminate on processing, i.e., in any manner that produces the interlocking network. For example, the polyamide and block copolymer may be dissolved in a solvent common for all and coagulated by admixing in a solvent in which none of the polymers are soluble. But more preferably, a particularly useful procedure is to intimately mix the polymers with sufficient mechanical shear and thermal energy to ensure that interlocking of the various networks is achieved. Intimate mixing is typically achieved by employing high shear extrusion compounding machines such as twin screw compounding extruders and thermoplastic extruders having at least a 20:1 L/D ratio and a compression ratio of 3 or 4:1.

The mixing or processing temperature (Tp) is selected in accordance with the particular polymers to be blended. For example, when melt blending the polymers instead of solution blending, it will be necessary to select a processing temperature above the melting point of the highest melting point polymer. In addition, as explained more fully hereinafter, the processing temperature may also be chosen so as to permit the isoviscous mixing of the polymers. Typically, the mixing or processing temperature is between about 150° C. and about 400° C.

Another parameter that is important in melt blending to ensure the formation of interlocking networks is matching the viscosities of the block copolymer and the polyamide (isoviscous mixing) at the temperature and shear stress of the mixing process. The better the interdispersion of the polyamide in the block copolymer network, the better the chance for formation of co-continuous interlocking networks on subsequent cooling. Therefore, it has been found that when the block copolymer has a viscosity $\eta$ poise at temperature Tp and a shear rate of 100 sec$^{-1}$, it is much preferred that the viscosity of the polyamide or blend containing such polyamide have a viscosity at temperature Tp and a shear rate of 100 sec$^{-1}$ such that the ratio of the viscosity of the block copolymer over the viscosity of the polyamide be between about 0.2 and about 4.0, preferably between about 0.8 and about 1.2. Accordingly, as used herein, isoviscous mixing means that the viscosity of the block copolymer divided by the viscosity of the other polymer or polymer blend at the temperature Tp is between about 0.2 and about 4.0. It should also be noted that within an extruder, there is a wide distribution of shear rates. Therefore, isoviscous mixing can occur even though the viscosity curves of two polymers differ at some of the shear rates.

The block copolymer or block copolymer blend may be selected to essentially match the viscosity of the polyamide. Optionally, the block copolymer may be mixed with a rubber compounding oil or supplemental resin as described hereinbefore to change the viscosity characteristics of the block copolymer.

The particular physical properties of the instant block copolymers are important in forming co-continuous interlocking networks. Specifically, the most preferred block copolymers of the instant invention when unblended do not melt in the ordinary sense with increasing temperature, since the viscosity of these polymers is highly non-Newtonian and tends to increase without limit as zero shear stress is approached. Further, the viscosity of these block copolymers is also relatively insensitive to temperature. This rheological behavior and inherent thermal stability of the block copolymer enhances its ability to retain its network (domain) structure in the melt so that when the various blends are made, interlocking and continuous networks are formed.

The viscosity behavior of the instant polyamide, on the other hand, typically is more sensitive to temperature than that of the instant block copolymers. Accordingly, it is often possible to select a processing temperature Tp at which the viscosities of the block copolymer and polyamines fall within the required range necessary to form interlocking networks.

D. Uses and Additional Components

The polymer blends of the instant invention may be compounded further with other oils, fillers, reinforcements, antioxidants, stabilizers, fire retardants, antiblocking agents and other rubber and plastic compounding ingredients without departing from the scope of this invention.

Examples of various fillers that can be employed are in the 1971-1972 Modern Plastics Encyclopedia, pages 240-247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, metal fibers, natural organic fibers, and synthetic organic fibers. Especially preferred are reinforced polymer blends of the instant invention containing about 2 to about 80 percent by weight glass fibers, based on the total weight of the resulting reinforcing blend. It is particularly desired that coupling agents, such as various silanes, be employed in the preparation of the reinforced blends.

The polymer blends of the instant invention can be employed in any use typically performed by engineering thermoplastics, such as metal replacements and those areas where high performance is necessary.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

Illustrative Embodiment I

In Illustrative Embodiment I, the moisture/impact relationship of nylon 6/6 was compared to the moisture/impact relationship of a nylon 6/6-block copolymer blend according to the present invention. The block copolymer was a selectively hydrogenated linear styrenebutadiene-styrene block copolymer according to the present invention. The blend was prepared by mixing 5 parts by weight of the block copolymer with 100 parts by weight of the nylon 6/6 at a temperature of 280° C. in a twin-screw extruder compounding-machine.

The two different samples were molded into plaques and placed in a controlled environment of 28° C. and 96% relative humidity. The moisture content and other properties were measured at periodic times. As the results show in Table I below, the blend containing the block copolymer possessed much improved impact strength at zero water level. Further, the polymer blend gained moisture at a lower rate than the nylon 6/6 itself.

TABLE I

| Polymer | Elapsed time | Moisture Content % wt. | Impact in-lb | Secant Modulus psi | Tensile at Break (0.2"/min.) psi | Elongation at Break % |
|---|---|---|---|---|---|---|
| Nylon 6/6 | 0 | 0 | 20 | 380,000 | 11,800 | 12 |
|  | 1 day | 0.68 | 560 | 300,000 | 9,100 | 22 |
|  | 2 days | 0.96 | 650 | 337,000 | 9,100 | 25 |
|  | 10 days | 3.28 | 500 | 220,000 | 6,783 | 23 |
| Nylon 6/6 | 0 | 0 | 570 | 393,000 | 10,270 | 20 |
| plus Block | 1 day | 0.43 | 575 | 345,000 | 9,450 | 24 |
| Copolymer | 2 days | 1.01 | 518 | 305,000 | 8,200 | 30 |
|  | 10 days | 2.82 | 563 | 230,000 | 7,000 | 30 |

Illustrative Embodiment II

A similar comparison to Illustrative Embodiment I was made in Illustrative Embodiment II, replacing the nylon 6/6 with a mineral filled nylon (Minlon nylon from Du Pont). In Illustrative Embodiment II, the blend with the block copolymer contained 100 parts by weight of the mineral filled nylon and 10 parts by weight of the block copolymer. The results shown below in Table II show a significant improvement in impact strength for the blends prepared according to the present invention.

TABLE II

| Polymer | Elapsed Time | Moisture Content % weight | Impact Strength inch-pounds |
|---|---|---|---|
| Minlon nylon | 0 | 0 | 10 |
|  | 1 day | 0.39 | 13 |
|  | 2 days | 0.59 | 8 |
| Minlon nylon | 0 | 0 | 12.5 |
| plus Block | 1 day | 0.31 | 20 |
| Copolymer | 2 days | 0.59 | 20 |

Illustrative Embodiment III

In Illustrative Embodiment III, a polymer blend containing 75% nylon 6 and 25% polycarbonate was blended with varying amounts of a block copolymer according to the present invention. The resulting blends were placed in a controlled environment of 23° C. and 100% relative humidity for 24 hours. The equilibrium water was then measured. When the measured moisture level is compared to the expected moisture level (taking into account the dilution factor), it is seen that the block copolymer unexpectedly reduces the moisture level below what one skilled in the art would expect. These results are presented below in Table III.

TABLE III

| Polymer | Measured Moisture Level, % weight | Expected Moisture Level, % weight |
|---|---|---|
| 100 parts Nylon 6 blend | 0.64 | 0.64 |
| 100 parts Nylon blend plus 15 parts block copolymer | 0.014 | 0.4 |
| 100 parts Nylon 6 blend plus 20 parts block copolymer | 0.045 | 0.25 |

We claim as our invention:

1. A composition consisting essentially of the admixture obtained by intimately mixing 100 parts by weight of a polyamide with between about 1 and about 40 parts by weight of a block copolymer wherein said block copolymer comprises at least two monoalkenyl arene polymer end blocks A and at least one substantially completely hydrogenated conjugated diene polymer mid block B and wherein said polyamide is selected from the group consisting of nylon 6 and nylon 6/6.

2. A composition according to claim 1 wherein said polyamide and block copolymer form at least partial continuous interlocking networks.

3. A composition according to claim 1 wherein said block copolymer is a linear ABA-type block copolymer.

4. A composition according to claim 1 wherein said block copolymer is a radial block copolymer.

5. A composition according to claim 4 wherein said radial block copolymer has the structure $(A-B)_x B-A$ where x is a number from about 2 to about 15.

6. A composition according to claim 3 or 4 wherein said A block is a polystyrene block and said B block is a substantially completely hydrogenated polybutadiene block.

7. A composition according to claim 1 wherein each A block has an average molecular weight of between about 5,000 and about 125,000, each B block has an average molecular weight of between about 10,000 and about 300,000, and the weight percentage of A blocks in the block copolymer is between about 8 percent and about 65 percent.

8. A composition according to claim 6 wherein said polybutadiene block has a 1,2 content of between about 35 percent and about 55 percent.

9. A composition according to claim 1 wherein said polyamide and block copolymer are melt blended under essentially isoviscous blending conditions.

10. A composition according to claim 1 wherein said polyamide is nylon 6.

11. A composition according to claim 1 wherein said polyamide is nylon 6/6.

12. An article prepared by thermoforming the composition of claim 1.

13. An article prepared by blow molding the composition of claim 1.

14. A polymer composition containing a filler and the admixture of claim 1.

15. A composition according to claim 1 wherein the amount of block copolymer is between about 4 and about 20 parts by weight per 100 parts by weight polyamide.

16. A composition according to claim 1 wherein the amount of block copolymer is about 5 parts by weight per 100 parts by weight polyamide.

17. A composition according to claim 18 wherein said polyamide is nylon 6/6.

18. The moisture-free composition of claim 1.

19. A composition according to claim 18 wherein said polyamide is nylon 6.

* * * * *